United States Patent
Wilson

(10) Patent No.: US 7,104,003 B2
(45) Date of Patent: Sep. 12, 2006

(54) QUICK-RELEASE SNAG RESISTANT FISHING NET RETAINER

(76) Inventor: Nick Wilson, 7650 Elk Creek Rd., Middletown, OH (US) 45042

( * ) Notice: Subject to any disclaimer, the term of this patent is extended or adjusted under 35 U.S.C. 154(b) by 0 days.

(21) Appl. No.: 10/854,436

(22) Filed: May 26, 2004

(65) Prior Publication Data

US 2005/0262754 A1 Dec. 1, 2005

(51) Int. Cl.
A01K 77/00 (2006.01)

(52) U.S. Cl. .......................................... 43/11; 114/255

(58) Field of Classification Search ...................... 43/7, 43/11, 12; 248/62; 403/234; 114/255; D22/135; 24/298
See application file for complete search history.

(56) References Cited

U.S. PATENT DOCUMENTS

| 661,604 | A | | 11/1900 | Grabler |
| 810,004 | A | | 1/1906 | Tabler |
| 1,024,653 | A | * | 4/1912 | Sargent ..................... 224/182 |
| 1,532,367 | A | * | 4/1925 | Bockman ................... 440/109 |
| 1,894,192 | A | * | 1/1933 | Olson ............................. 43/12 |
| 2,437,331 | A | * | 3/1948 | Murray et al. ............... 224/103 |
| 2,578,237 | A | * | 12/1951 | Geistweit .................... 224/270 |
| 2,619,755 | A | * | 12/1952 | Henson .......................... 43/12 |
| 2,637,133 | A | * | 5/1953 | Ross ............................... 43/12 |
| 2,688,204 | A | * | 9/1954 | Laubhan ........................ 43/12 |
| 2,885,696 | A | * | 5/1959 | Sauer, Jr. .................... 114/364 |
| 3,194,524 | A | | 7/1965 | Trumbull |
| 3,218,012 | A | | 11/1965 | Volpe |
| 3,802,655 | A | * | 4/1974 | Schuplin .................... 248/74.1 |
| 3,978,535 | A | * | 9/1976 | Swan et al. .................. 114/361 |
| 4,042,198 | A | * | 8/1977 | Takeuchi ..................... 248/62 |
| 4,407,478 | A | | 10/1983 | Hodges |
| 4,824,057 | A | | 4/1989 | Suprono |
| D308,015 | S | | 5/1990 | Volpe et al. |
| 5,044,583 | A | * | 9/1991 | Daigle et al. ................. 248/62 |
| 5,099,597 | A | | 3/1992 | Whistle |
| 5,385,320 | A | | 1/1995 | Ismert et al. |
| 5,845,882 | A | | 12/1998 | Hodges et al. |
| 5,996,267 | A | * | 12/1999 | Breckenridge ................. 43/12 |
| 6,595,471 | B1 | | 7/2003 | Botting |
| 6,883,762 | B1 | * | 4/2005 | Miura et al. ............... 248/74.2 |

* cited by examiner

*Primary Examiner*—Kurt Rowan
(74) *Attorney, Agent, or Firm*—Gallagher & Dawsey Co., LPA; Michael J. Gallagher; David J. Dawsey

(57) ABSTRACT

A quick-release snag resistant fishing net retainer designed to securely hold a fishing net to a boat. The net retainer includes a compressive retainer and a mounting means. The retainer is formed with a resilient arm that is configured to create a neck between the resilient arm and either the retainer or a mounting means through which a rim of the fishing net may be forced. Once the rim has been forced through the neck, the resilient arm returns to its initial position thereby securing the fishing net. The mounting means releasably attaches the retainer to the boat and may include retainer bands or screws to attach the retainer to a post on the boat, or a flat surface mounting implement to attach the retainer to any flat surface of the boat. An implement guard may be incorporated to improve the snag resistance of the retainer and minimize tripping hazards.

15 Claims, 4 Drawing Sheets

QUICK-RELEASE SNAG RESISTANT FISHING NET RETAINER

TECHNICAL FIELD

The present invention relates to the field of watercraft accessories, in particular, to a quick release snag resistant fishing net retainer for use on recreational boats.

BACKGROUND OF THE INVENTION

Recreational boaters, especially fishermen, have long sought ways to effectively store cargo. This is particularly true with modem recreational fishing boats known as bass boats that have low profile hulls and relatively flat fishing decks. Such boats have optimized storage as much as possible by incorporating under-deck rod and tackle holders. However, convenient storage of a fishing net has not yet been obtained.

One problem associated with storing a fishing net is caused by the odd shape of the fishing net. A majority of recreational fishing nets are 48"–60" in length, composed of an oblong shaped 18"–30" net opening at one end and a tubular handle at the other end. The simple geometry of such a fishing net makes it impractical to store below the deck because it would create a great deal of wasted space. Therefore, fishing nets are generally stored on the deck of recreational fishing boats.

Storing lightweight, large surface area, fishing nets unsecured on the deck of a fishing boat during transport is especially dangerous. This is true both during the transport of the boat to and from the lake, as well as when the boat is cruising across a body of water. Fishermen have developed a number of ways to secure a fishing net to a boat so as to prevent the net from becoming a projectile. A majority of the commonly used tie-down techniques incorporate bungee cords or rope to secure the net in the boat. While such methods are generally adequate, they are not convenient, especially for fishermen that traverse a lake many times during a fishing day to visit their favorite fishing spots. The cords, or ropes, generally get tangled in the netting of the fishing net and are not easy to remove as a fisherman is reeling in a catch, and they can be dangerous in that they create a tripping danger to the boat's occupants. Another method of securing a fishing net often observed as boats travel between fishing spots is that of wedging the handle portion of a fishing net between the driver's, or passenger's, seat and a portion of the boat. While this method permits a fisherman to quickly grab the fishing net while fighting a fish, the fishing net is not in the most convenient location nor does it provide the level of security that is necessary to ensure that the net does not become a projectile as the boat rapidly crosses rough water.

What has been needed in the recreational boating industry is a convenient, inexpensive, fishing net retainer that is easy to install, reliably secures the fishing net, marine environment resistant, snag resistant, facilitates quick-release of the fishing net with a single arm, and is not a tripping hazard. While some prior art methods achieve some of these qualities, none do so in the manner and efficiency of the present invention.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

The quick-release snag resistant fishing net retainer of the present invention is designed to securely hold a fishing net to a boat during travel, while permitting easy access to the fishing net when desired. The net retainer includes a compressive retainer and a mounting means. The compressive retainer has a proximal end and a distal end, and is formed with a resilient arm near the distal end. The resilient arm is configured to create a neck between the resilient arm and either the retainer or a mounting means through which a rim of the fishing net may be forced. Once the rim has been forced through the neck, the resilient arm returns to its initial position thereby securing the fishing net in place. Egress is performed using the same process of displacing the resilient arm and may be easily accomplished by a fisherman grabbing the handle of a fishing net with a single hand and pulling up. The mounting means releasably attaches the compressive retainer to the boat.

The mounting means may include retainer bands or screws to attach the retainer to a post on the boat, or a flat surface mounting implement to attach the retainer to any flat surface of the boat. The mounting implement is configured to be secured to a deck, or any substantially flat surface, of the boat. The compressive retainer is configured to cooperate with the mounting implement so that it is secured in place when the mounting implement is secured to the deck. In this embodiment, the resilient arm is configured to secure the rim against the engagement surface.

The quick-release snag resistant fishing net retainer may further include an implement guard configured to cooperate with the flat surface mounting implement to improve the snag resistance of the retainer and to reduce the likelihood of the retainer being a tripping hazard. It is preferable to have the shape of the mounting implement and the implement guard to compliment each other to create a low profile dome shape. A further embodiment increases the snag resistance of the retainer by incorporating a flexible cover joining the resilient arm and the implement guard. The flexible cover encloses the space between resilient arm and the implement guard thereby reducing the likelihood that a portion of the net becomes tangled about the resilient arm.

These variations, modifications, alternatives, and alterations of the various preferred embodiments may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

Also, in the various figures and drawings, the following reference symbols and letters are used to identify the various elements described herein below in connection with the several figures and illustrations: B, D, FN, F, N, P, R, and S.

DETAILED DESCRIPTION OF THE INVENTION

The quick-release snag resistant fishing net retainer of the instant invention enables a significant advance in the state of the art. The preferred embodiments of the apparatus accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
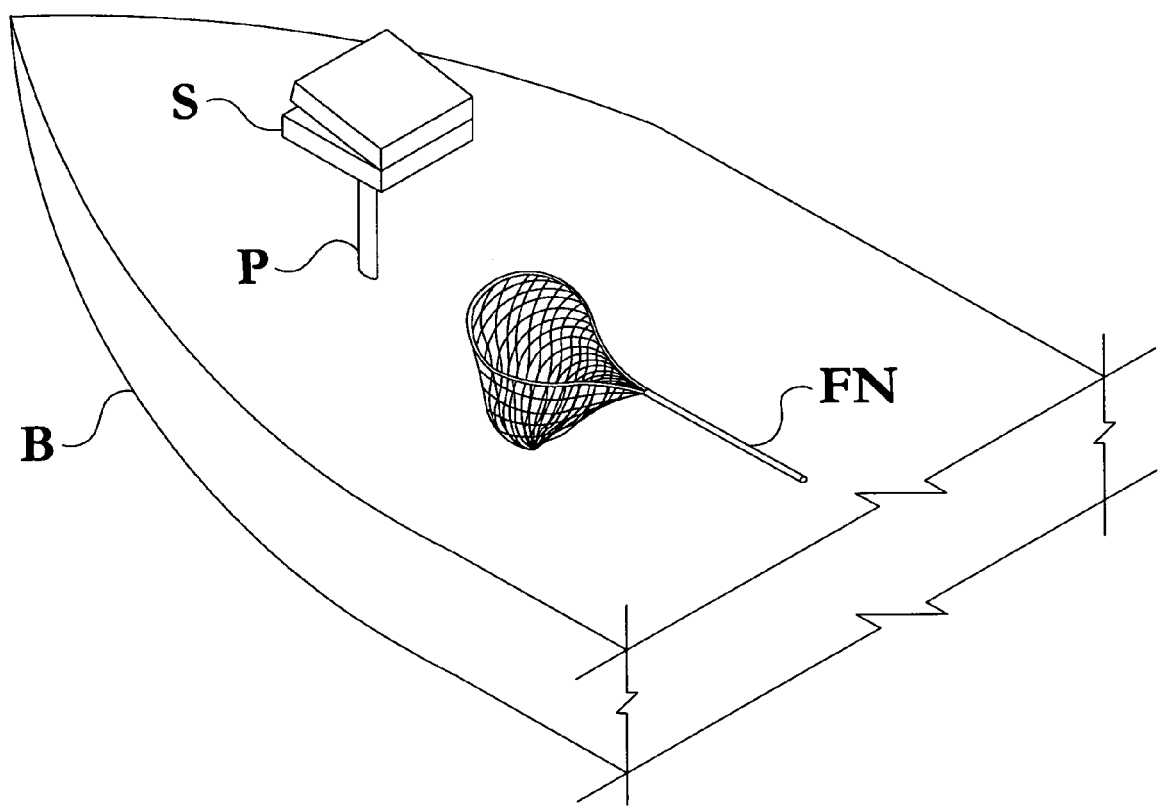
FIG. 1 shows a partial elevated perspective view of a boat, not to scale.
Figure 2:
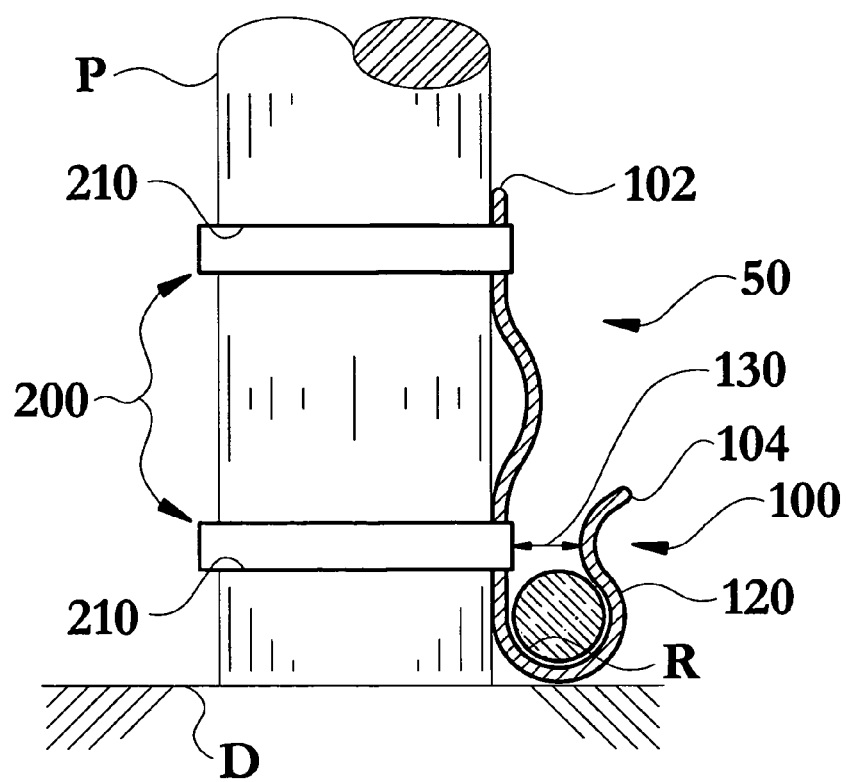
FIG. 2 shows a side elevation view of the quick-release snag resistant fishing net retainer, not to scale.
Figure 3:
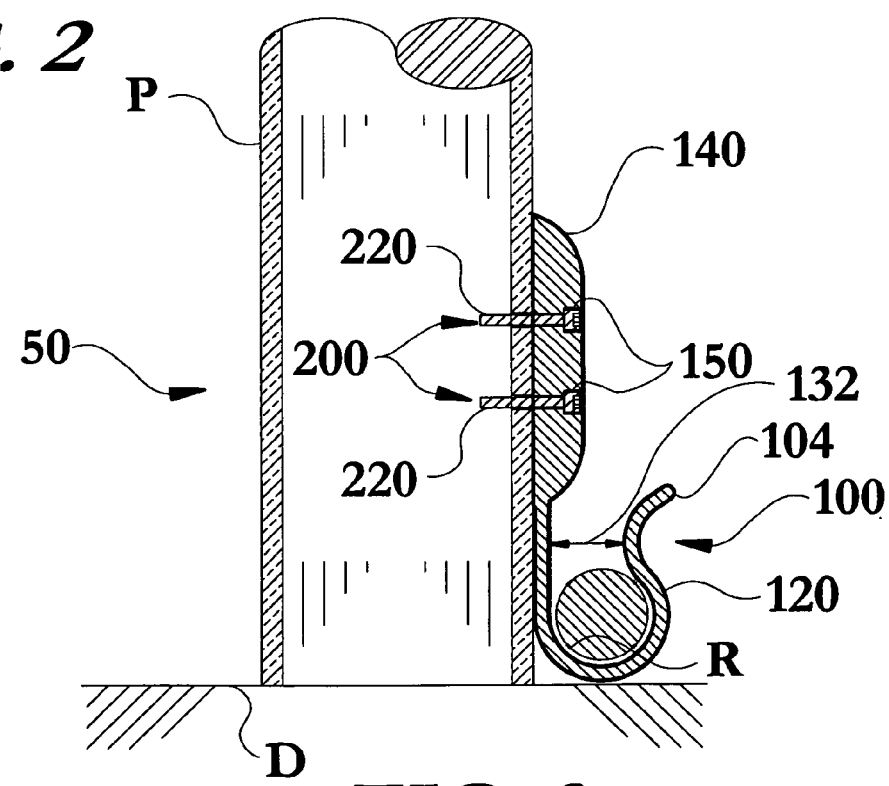
FIG. 3 shows a cross-sectional view of the quick-release snag resistant fishing net retainer, not to scale.

Referring to FIG. 1, the quick-release snag resistant fishing net retainer (50) is designed to securely hold a fishing net (FN) to a boat (B) during travel. With reference now to FIG. 2, the net retainer (50) includes a compressive retainer (100) and a mounting means (200). The compressive retainer (100) has a proximal end (102) and a distal end (104), and is formed with a resilient arm (120) near the distal end (104). The resilient arm (120) is configured to create a neck (130) between the resilient arm (120) and either the retainer (100), as seen in FIG. 3, or a mounting means (200), as seen in FIG. 2, through which a rim (R) of the fishing net (FN) may be forced. The mounting means (200) releasably attaches the compressive retainer (50) to the boat (B).

The neck (130) has a locked position neck opening (132), illustrated in FIG. 3, that is less than a diameter of the rim (R) of the fishing net (FN) so that the rim (R) is secured in place by the resilient arm (120). The resilient arm (120) is constructed so that it is flexible to permit the passage of the rim (R) during ingress and egress of the rim (R), yet the resilient arm (120) has adequate rigidity to retain the fishing net (FN) during transport over rough waters. Further, the shape of the resilient arm (120) is such that it guides the rim (R) to the neck during ingress and egress of the rim (R).

The mounting means (200) may include at least one retainer band (210) encircling the perimeter of a post (P) on the boat (B) and the compressive retainer (50) thereby securely attaching the compressive retainer (50) to the boat (B), as seen in FIG. 2. In this embodiment the retainer (100) is formed from a single piece of material. The resilient arm (120) is formed near the distal end (104) of the retainer (100) and is essentially a portion of the retainer (100) that is bent 180 degrees from the remainder of the retainer (100). The resilient arm (120) is generally formed in a curvilinear shape such as that shown in FIG. 2 so that a neck (130) is created. The neck (130) is smaller than the diameter of the rim (R) of the fishing net (FN) so that the rim (R) cannot pass through the neck (130) without external force applied to the rim (R) or the neck (130). The force required to pass the rim (R) through the neck (130) is not significant, however it is greater than the force exerted on the neck (130) by the rim (R) during high-speed travel of the boat in rough waters. The generally curvilinear shape of the resilient arm (120) guides the rim (R) to the neck (130) to promote ingress and egress.

The resilience of the resilient arm (120) is generally imparted simply by the construction of the retainer (100) and the materials of construction. The retainer (100), and the retainer band (210) is preferably formed of relatively lightweight corrosion resistant materials such as aluminum, stainless steel, coated carbon steel and alloys, as well as plastics. The width of the retainer (100), the dimension into the sheet in FIG. 2, is generally less than five times the cross-sectional diameter of the rim (R) of the fishing net (FN). Further, it is preferable to minimize the width of the retainer (100) so that it may be used with a wide variety of fishing nets (FN). For instance, if the width of the retainer (100) were extremely large then it would most likely not be usable with a fishing net (FN) having a relatively small net diameter. Therefore, it has been further determined that the width of the retainer (100) is ideally less than two times the cross-sectional diameter of the rim (R). Additionally, the neck (130) is preferably less than approximately ninety percent of the cross-sectional diameter of the rim (R). The resilient arm (120) preferably requires a force of less than twenty pounds applied at the rim (R) to displace the resilient arm (120) during ingress and egress of the rim (R) through the neck.

An alternative embodiment illustrated in FIG. 3 incorporates the use of at least one screw (220) as the mounting means (200). In this particular embodiment the retainer (100) has a body (140) attached to the retainer (100) and the body (140) is formed with at least one mounting recess (150) to receive a screw (220) adapted to engage a post (P) on the boat (B). The mounting recess (150) may be formed to permit the entire screw (220) to be recessed into the body (140) to further improve its snag resistance.

Figure 4:
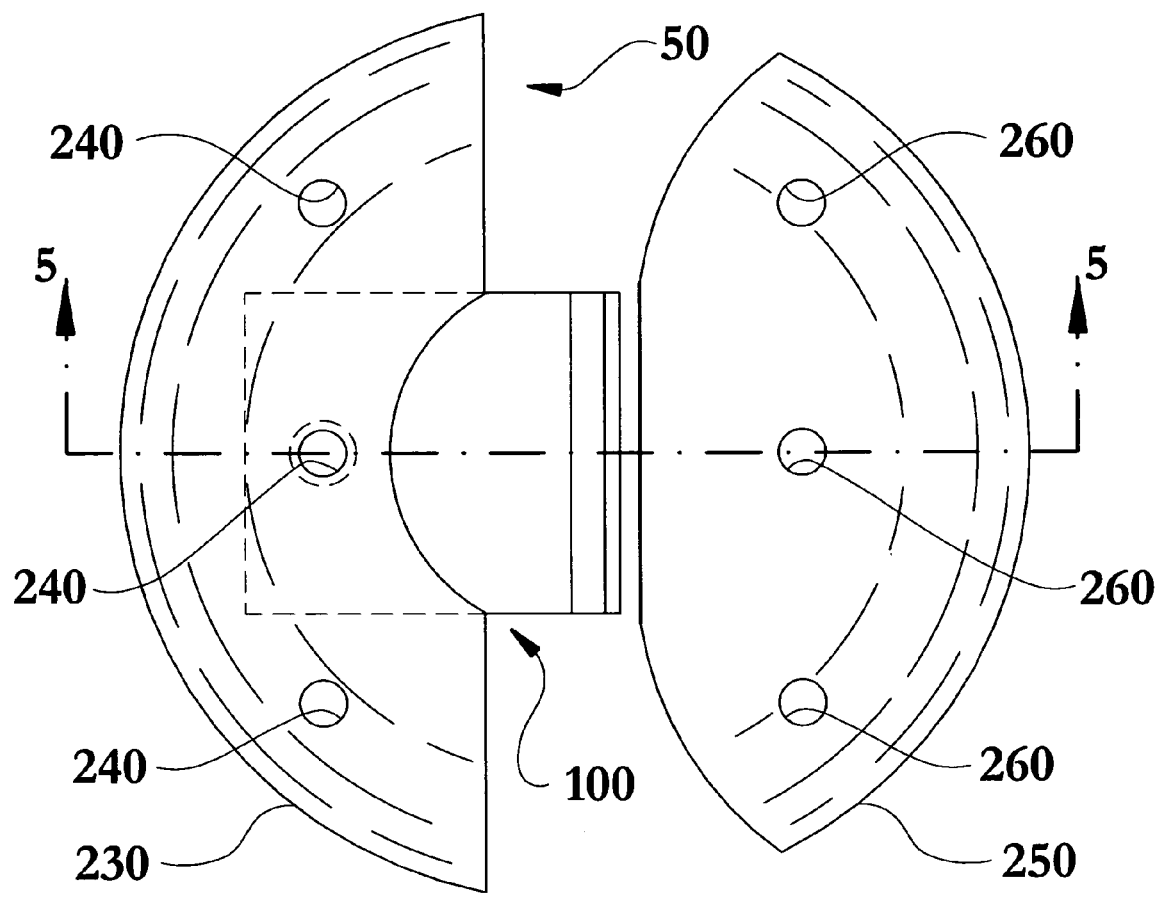
FIG. 4 shows a top plan view of the quick-release snag resistant fishing net retainer, not to scale.
Figure 5:
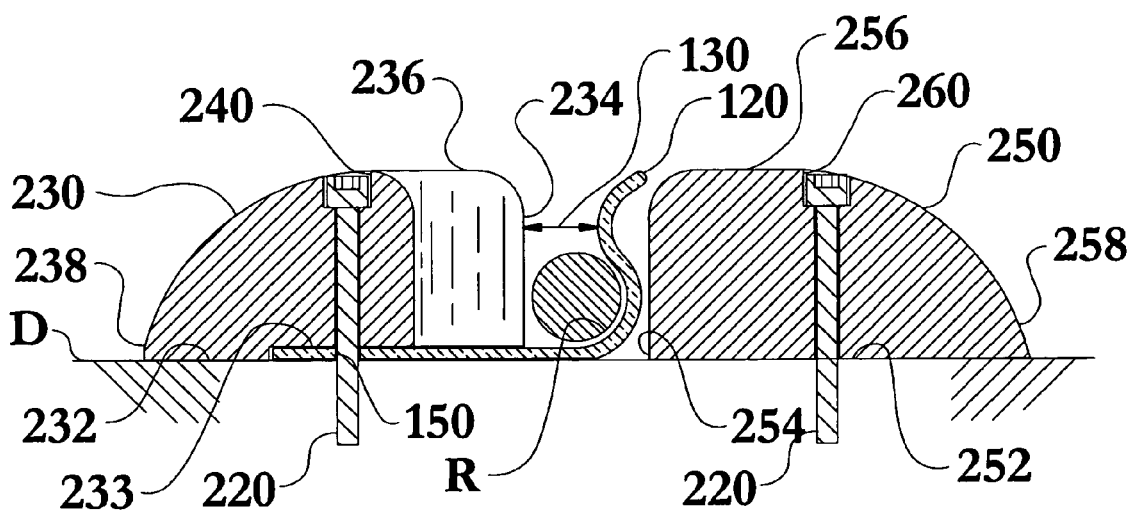
FIG. 5 shows cross-sectional view of the quick-release snag resistant fishing net retainer taken along section line 5—5 in FIG. 4, not to scale.

In yet a further embodiment, illustrated in FIG. 4 and FIG. 5, the mounting means (200) includes a flat surface mounting implement (230), configured to be secured to a deck (D), or any substantially flat surface, of the boat (B). The mounting implement (230) has a mounting surface (232) in contact with the deck (D) that is formed with a retainer recess (233), an engagement surface (234), a top surface (236), and a rear surface (238). The compressive retainer (100) is configured to cooperate with the retainer recess (233) so that it is secured in place when the mounting implement (230) is secured to the deck (D). The resilient arm (120) is configured to secure the rim (R) against the engagement surface (234). In this embodiment the neck (130) is created between the resilient arm (120) and the engagement surface (234).

The flat surface mounting implement (230) may be formed with at least one screw recess (240) and the compressive retainer (100) may be formed with at least one mounting recess (150) that aligns with one of the at least one screw recesses (240). The screw recess (240) and one mounting recess (150) are configured to cooperate and receive a mounting screw (220) to secure the implement (230) to the deck (D). The neck (130) may be adjustable by forming the at least one mounting recess (150) as a slot. Such adjustability facilitates use of the compressive retainer (100) with fishing nets (FN) having varying sized rims (R).

As seen in FIG. 4 and FIG. 5, the quick-release snag resistant fishing net retainer (50) may further include an implement guard (250) configured to cooperate with the flat surface mounting implement (230) to improve the snag resistance of the retainer (50) and to reduce the likelihood of the retainer (50) being a tripping hazard. The implement guard (250) may have a mounting surface (252) in contact with the deck (D), an interior surface (254) in close proximity to the resilient arm (120), a top surface (256) at substantially the same elevation as the top surface (236) of the implement (230), and a rear surface (258). The elevation of the top surfaces (236, 256) above the deck (D) is preferably less than three times the diameter of the rim (R). As with the mounting implement (230), the implement guard (250) may be formed with at least one screw recess (260) configured to cooperate and receive a mounting screw (220) to secure the guard (250) to the deck (D).

Virtually any shape and contour of the mounting implement (230) and the implement guard (250) is permissible, however the snag resistance and tripping hazard properties are optimized when the rear surface (238) and the top surface (236) of the implement (230) are joined in with a large radius curve, and the rear surface (258) and the top surface (256) of the guard (250) are joined in with a large radius curve, as seen in FIG. 5.

Figure 6:
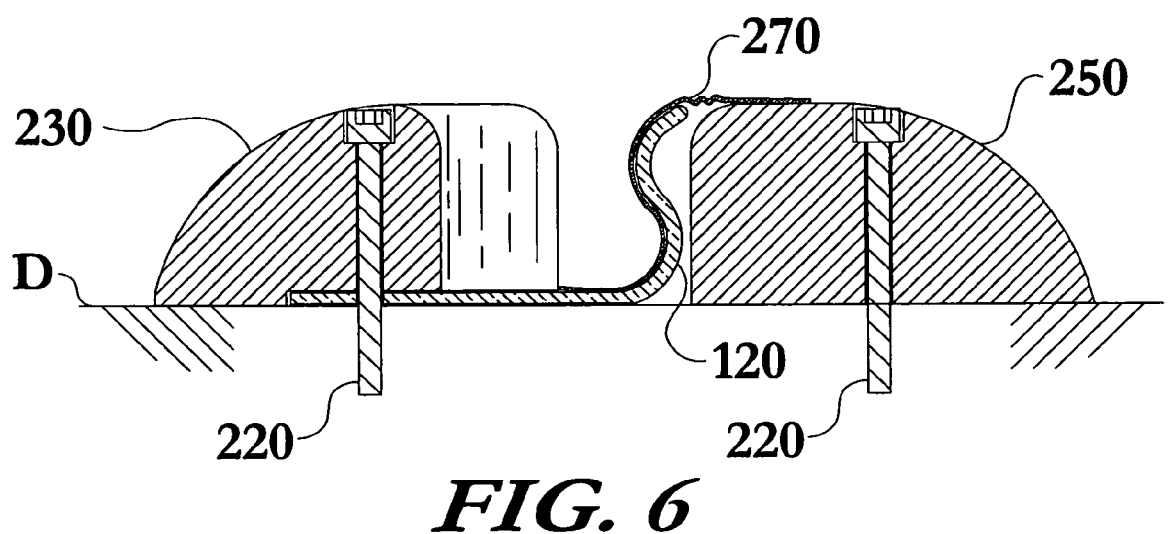
FIG. 6 shows a cross-sectional view of the quick-release snag resistant fishing net retainer, not to scale.

A further embodiment increases the snag resistance of the retainer (100) by incorporating a flexible cover (270), as seen in FIG. 6. The flexible cover (270) joins the resilient arm (120) and the implement guard (250) and encloses the space there between thereby reducing the likelihood that a portion of the net becomes tangled about the resilient arm (120). The flexible cover (270) may be constructed of any pliable material that is water resistant. Additionally, the flexible cover (270) may be connected to, or secured to, the resilient arm (120), or mounting implement (230), and the implement guard (250) in a number of equally effective ways. For example, by way of illustration and not limitation, the flexible cover (270) may be secured via a fusion seal or mechanical joining means such as rivets, snaps, zippers, clasps, crimping, or other mechanical means.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A quick-release snag resistant fishing net retainer (50) to securely hold a fishing net (FN) to a boat (B) during travel, comprising:

a compressive retainer (100) having a proximal end (102) and a distal end (104), and formed with a resilient arm (120) near the distal end (104) such that the resilient arm (120) is configured to create a neck (130) between the resilient arm (120) and either the retainer (100) or a mounting means (200), the neck (130) having a locked position neck opening (132) that is less than a diameter of a rim (R) of the fishing net (FN) so that the resilient arm (120) must be displaced to allow the rim (R) to pass through the neck (130) and such that the rim (R) is secured in place by the resilient arm (120) once it has passed through the neck (130); and the mounting means (200) releasably attaching the compressive retainer (50) to a deck (D) of the boat (B); wherein the mounting means (200) includes a flat surface mounting implement (230), configured to be secured to a top surface of a deck (D) of the boat (B), having a mounting surface (232) in contact with the deck (D) and formed with a retainer recess (233), an engagement surface (234), a top surface (236), and a rear surface (238), wherein the compressive retainer (100) is configured to cooperate with the retainer recess (233) and the resilient arm (120) is configured to secure the rim (R) against the engagement surface (234); and further including an implement guard (250) configured to cooperate with the flat surface mounting implement (230) to improve the snag resistance of the retainer (50) and to reduce the likelihood of the retainer (50) being a tripping hazard, the implement guard (250) having a mounting surface (252) in contact with the deck (D), an interior surface (254) in close proximity to the resilient arm (120), a top surface (256) at substantially the same elevation as the top surface (236) of the implement (230), and a rear surface (258).

2. The quick-release snag resistant fishing net retainer (50) of claim 1, wherein the flat surface mounting implement (230) is formed with at least one screw recess (240) and wherein the compressive retainer (100) is formed with at least one mounting recess (150), the screw recess (240) and tho mounting recess (150) configured to cooperate and receive a mounting screw (220) to secure the implement (230) to the deck (D).

3. The quick-release snag resistant fishing net retainer (50) of claim 2, wherein the at least one mounting recess (150) is formed as a slot to impart adjustability to the neck (130) thereby facilitating use with fishing nets (FN) having varying sized rims (R).

4. The quick-release snag resistant fishing net retainer (50) of claim 1, wherein the implement guard (250) is formed with at least one screw recess (260) configured to cooperate and receive a mounting screw (220) to secure the guard (250) to the deck (D).

5. The quick-release snag resistant fishing net retainer (50) of claim 4, wherein the rear surface (238) and the top surface (236) of the implement (230) are joined in with a large radius curve, and the rear surface (258) and the top surface (256) of the guard (250) are joined in with a large radius curve, to minimize the likelihood of being a tripping hazard.

6. A quick-release snag resistant fishing net retainer (50) to securely hold a fishing net (FN) to a boat (B) during travel, comprising:

a compressive retainer (100) having a proximal end (102) and a distal end (104), and formed with a resilient arm (120) near the distal end (104) such that the resilient arm (120) is configured to create a neck (130) between the resilient arm (120) and either the retainer (100) or a mounting means (200), the neck (130) having a locked position neck opening (132) that is less than a diameter of a rim (R) of the fishing net (FN) so that the resilient arm (120) must be displaced to allow the rim (R) to pass through the neck (130) and such that the rim (R) is secured in place by the resilient arm (120) once it has passed through, the neck (130); and the mounting means (200) releasably attaching the compressive retainer (50) to a deck (D) of the boat (B), wherein the mounting means (200) includes a flat surface mounting implement (230), configured to be secured to a top surface of a deck (D) of the boat (B), having a mounting surface (232) in contact with the deck (D) and formed with a retainer recess (233), an engagement surface (234), a top surface (236), and a rear surface (238), wherein the compressive retainer (100) is configured to cooperate with the retainer recess (233) and the resilient arm (120) is configured to secure the rim (R) against the engagement surface (234);

wherein the flat surface mounting implement (230) is formed with at least one screw recess (240) and wherein the compressive retainer (100) is formed with at least one mounting recess (150), the screw recess (240) and the mounting recess (150) configured to cooperate and receive a mounting screw (220) to secure the implement (230) to the deck (D).

7. The quick-release snag resistant fishing net retainer (50) of claim 6, wherein the at least one mounting recess (150) is formed as a slot to impart adjustability to the neck (130) thereby facilitating use with fishing nets (FN) having varying sized rims (R).

8. The quick-release snag resistant fishing net retainer (50) of claim 6, further including an implement guard (250) configured to cooperate with the flat surface mourning implement (230) to improve the snag resistance of the retainer (50) and to reduce the likelihood of the retainer (50) being a tripping hazard, the implement guard (250) having a mounting surface (252) in contact with the deck (D), an interior surface (254) in close proximity to the resilient arm (120), a top surface (256) at substantially the same elevation as the top surface (236) of the implement (230), and a rear surface (258).

9. The quick-release snag resistant fishing net retainer (50) of claim 8, wherein the implement guard (250) is formed with at least one screw recess (260) configured to cooperate and receive a mounting screw (220) to secure the guard (250) to the deck (D).

10. The quick-release snag resistant fishing net retainer (50) of claim 9, wherein the rear surface (238) and the top surface (236) of the implement (230) are joined in with a large radius curve, and the rear surface (258) and the top surface (256) of the guard (250) are joined in with a large radius curve, to minimize the likelihood of being a tripping hazard.

11. A quick-release snag resistant fishing net retainer (50) to securely hold a fishing net (FN) to a boat (B) during travel, comprising:

a compressive retainer (100) having a proximal end (102) and a distal end (104), and formed with a resilient arm (120) near the distal end (104) such that the resilient arm (120) is configured to create a neck (130) between the resilient arm (120) and either the retainer (100) or a mounting means (200), the neck (130) having a locked position neck opening (132) that is less than a diameter of a rim (R) of the fishing net (FN) so that the resilient arm (120) must be displaced to allow the rim (R) to pass through the neck (130) and such that the rim (R) is secured in place by the resilient arm (120) once it has passed through the neck (130); the mounting means (200) releasably attaching the compressive retainer (50) to the boat (B), wherein the mounting means (200) includes a flat surface mounting implement (230), configured to be secured to a deck (D) of the boat (B), having a mounting surface (232) in contact with the deck (D) and formed with a retainer recess (233), an engagement surface (234), a top surface (236), and a rear surface (238), wherein the compressive retainer (100) is configured to cooperate with the retainer recess (233) and the resilient arm (120) is configured to secure the rim (R) against the engagement surface (234); and an implement guard (250) configured to cooperate with the flat surface mounting implement (230) to improve the snag resistance of the retainer (50) and to reduce the likelihood of the retainer (50) being a tripping hazard, the implement guard (250) having a mounting surface (252) in contact with die deck (D), an interior surface (254) in close proximity to the resilient arm (120), a top surface (256) at substantially the same elevation as the top surface (236) of the implement (230), and a rear surface (258).

12. The quick-release snag resistant fishing net retainer (50) of claim 11, wherein the flat surface mounting implement (230) is formed with at least one screw recess (240) and wherein the compressive retainer (100) is formed with at least one mounting recess (150), the screw recess (240) and the mounting recess (150) configured to cooperate and receive a mounting screw (220) to secure the implement (230) to the deck (D).

13. The quick-release snag resistant fishing net retainer (50) of claim 12, wherein the at least one mounting recess (150) is formed as a slot to impart adjustability to the neck (130) thereby facilitating use with fishing nets (FN) having varying sized rims (R).

14. The quick-release snag resistant fishing net retainer (50) of claim 11, wherein the implement guard (250) is formed with at least one screw recess (260) configured to cooperate and receive a mounting screw (220) to secure the guard (250) to the deck (D).

15. The quick-release snag resistant fishing net retainer (50) of claim 14, wherein the rear surface (238) and the top surface (236) of the implement (230) rejoined in with a large radius curve, and the rear surface (258) and the top surface (256) of the guard (250) are joined in with a large radius curve, to minimize the likelihood of being a tripping hazard.

* * * * *